(12) United States Patent
Sobel et al.

(10) Patent No.: US 9,075,497 B1
(45) Date of Patent: Jul. 7, 2015

(54) ENABLING SELECTIVE POLICY DRIVEN SEAMLESS USER INTERFACE PRESENTATION BETWEEN AND AMONG A HOST AND A PLURALITY OF GUESTS

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 897 days.

(21) Appl. No.: 13/048,668

(22) Filed: Mar. 15, 2011

(51) Int. Cl.
G06F 3/00 (2006.01)
G06F 3/0481 (2013.01)
G06F 3/01 (2006.01)
G06F 1/16 (2006.01)

(52) U.S. Cl.
CPC ............ *G06F 3/0481* (2013.01); *G06F 1/1626* (2013.01)

(58) Field of Classification Search
CPC ............................... G06F 3/048; G06F 3/0481
USPC .................... 715/741, 751, 750, 856
See application file for complete search history.

(56) References Cited

U.S. PATENT DOCUMENTS

| | | | |
|---|---|---|---|
| 5,796,396 A * | 8/1998 | Rich | 715/741 |
| 6,285,363 B1 * | 9/2001 | Mairs et al. | 715/751 |
| 6,343,313 B1 * | 1/2002 | Salesky et al. | 709/204 |
| 7,506,265 B1 * | 3/2009 | Traut et al. | 715/763 |
| 7,620,915 B2 * | 11/2009 | Ludwig | 715/856 |
| 7,774,703 B2 * | 8/2010 | Junuzovic et al. | 715/246 |
| 8,209,408 B1 * | 6/2012 | Huang et al. | 709/223 |
| 2002/0143906 A1 * | 10/2002 | Tormasov et al. | 709/220 |
| 2005/0198578 A1 * | 9/2005 | Agrawala et al. | 715/750 |
| 2005/0278642 A1 * | 12/2005 | Chang et al. | 715/751 |
| 2008/0115144 A1 * | 5/2008 | Tsao | 718/105 |
| 2010/0211879 A1 * | 8/2010 | Tsao | 715/736 |

OTHER PUBLICATIONS

"Getting Started with VMware Fusion, VMware Fusion for Mac OS X;" 2007-2009; pp. 1-20.
"Workstation User's Manual, VMware Workstation 7.1;" 1998-2010; pp. 1-17, and pp. 157-161.
Kissell; "Take Control of VMware Fusion 3;" 2009; pp. 1-4, and pp. 52-55.

* cited by examiner

*Primary Examiner* — Nicholas Augustine
(74) *Attorney, Agent, or Firm* — Brill Law Office; Jeffrey Brill

(57) ABSTRACT

Selective projection of user interface elements between a host and a plurality of guests is provided according to a configurable policy. User interface elements generated by guests and/or the host are captured. It is determined whether to project captured elements into the user interface with which the user is currently interacting, based on the policy. In some cases, it is determined to project a captured element originating from a first user interface into a second user interface with which the user is currently interacting, based on factors such as source, destination, element attributes, element contents and/or element type. Responsive to such a determination, the captured element is projected into the current user interface, thereby presenting the projected element to the user.

20 Claims, 4 Drawing Sheets

ENABLING SELECTIVE POLICY DRIVEN SEAMLESS USER INTERFACE PRESENTATION BETWEEN AND AMONG A HOST AND A PLURALITY OF GUESTS

TECHNICAL FIELD

This disclosure pertains generally to virtual machines and user interfaces, and more specifically to enabling selective policy driven seamless user interface presentation between and among a host and a plurality of guests.

BACKGROUND

In the world of virtual computing, multiple virtual machines (VMs or guests) can be instantiated at a software level on a single physical computer (host computer). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

In a virtualization environment, it is possible for guests to run different operating systems than the host. Some existing virtualization tools support some integration between a host and a guest running different operating systems at a client level. For example, VMware Fusion allows a Mac host to run a Windows guest. The Windows guest can be run in a full screen mode, in which case the user sees a typical Windows user interface. However, by using a feature of Fusion called Unity, Windows applications being run on the Windows guest appear alongside Mac applications running on the host, within a single, Mac based view. VMware Workstation is a similar product for Windows hosts, with a Unity feature that allows applications being run on guests with other operating systems (e.g., Linux) to appear on the Windows host desktop, alongside host applications. Parallels Desktop is a similar product. It has a Unity-like feature called Coherence.

For a number of reasons, the use of the Unity feature of Fusion or the Coherence feature of Parallels Desktop is common practice. Mac users often utilize Unity or Coherence to perform everyday tasks that are best accomplished using a Windows application. A common example is the use of Outlook to access corporate email from Exchange. While there are native Mac alternatives, the latest and best integrated email features tend to be superior on Windows applications.

In addition, using separate guests to house different application sets can be useful, on either a Mac or Windows (or other) host. This technique enables the creation of a separate "virtual appliance" for each application set, in which the operating system environment within the guest running the application set is specifically tuned to maximize performance and meet the needs of that application set. Fine tuning for multiple application sets within a single operating system environment can result in conflicts. Such conflicts can be avoided by using this virtual appliance approach, in which each application set runs in its own guest, thereby keeping the operating system environments separated. This not only reduces the risk of conflict or interference between environments, but provides a level of granularity that can be extremely convenient. Therefore, Unity or Coherence is frequently used for this reason as well.

When running a guest with a separate operating system on a host, it is also not uncommon to switch user interface context fully into a particular guest for specific tasks best suited to that environment (e.g., software development in general, or more particularly for a target operating system other than that of the host). This involves switching out of Unity/Coherence mode, and utilizing the guest environment immersively in full screen mode. Under the currently existing virtualization tools such as Fusion and Desktop, when immersed within a given guest in full screen mode (as opposed to running guest applications on the host desktop using Unity or Coherence), there is no way to interact unobtrusively with the host or its applications. When key host operating system alerts or events occur (e.g., host operating system going down, host almost out of power), the user can be unceremoniously "yanked" out of the full screen guest operating system user interface in which s/he is working, and thrust into the full screen host operating system user interface in order to react to an important host level warning or the like. Furthermore, currently existing virtualization tools do not provide a way for a user immersed in a first guest user interface to receive user interface notifications from or in a second guest user interface.

It would be desirable to address these issues.

SUMMARY

A user interface element projection management system enables selective projection (e.g., at a hypervisor level) of user interface elements between and among a host and a plurality of guests, based on a policy. User interface elements generated by at least some guests of the plurality are captured. In some embodiments, this further comprises capturing user interface elements captured by the host and/or all of the guests. In some embodiments, when the user is directly interacting with the user interface of a specific operating system environment, user interface elements generated by operating system environments with which the user is not directly interacting are captured.

It is determined whether to project captured user interface elements into the user interface of an operating system environment with which a user is currently interacting, based on a maintained policy indicating user elements to be projected between sources and destinations under various conditions. A default policy can be provided, or the policy can be configured by various parties. In some embodiments, updates to the policy are received, and the policy is updated accordingly. Based on the policy, it is determined to project at least one specific captured user interface element originating from a first user interface context into a second user interface context with which the user is currently interacting. This determination can be made based on factors and/or combinations of factors such as the source of the specific captured user interface element, the operating system environment with which the user is currently interacting, one or more attributes of the captured element, contents of the captured element and/or the type of the captured element.

Responsive to determining to project the at least one specific captured user interface element into the user interface of the operating system environment with which the user is currently interacting, the captured element is so projected, thereby presenting the projected user interface element to the user. This can comprise projecting a user interface element originating from the host into the user interface context of a specific guest, projecting a user interface element originating from a specific guest into the user interface context of the host and/or projecting a user interface element originating from a first specific guest into the user interface context of a second specific guest. In can also be determined to suppress projecting at least one specific captured user interface element into the user interface of the operating system environment with which the user is currently interacting.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
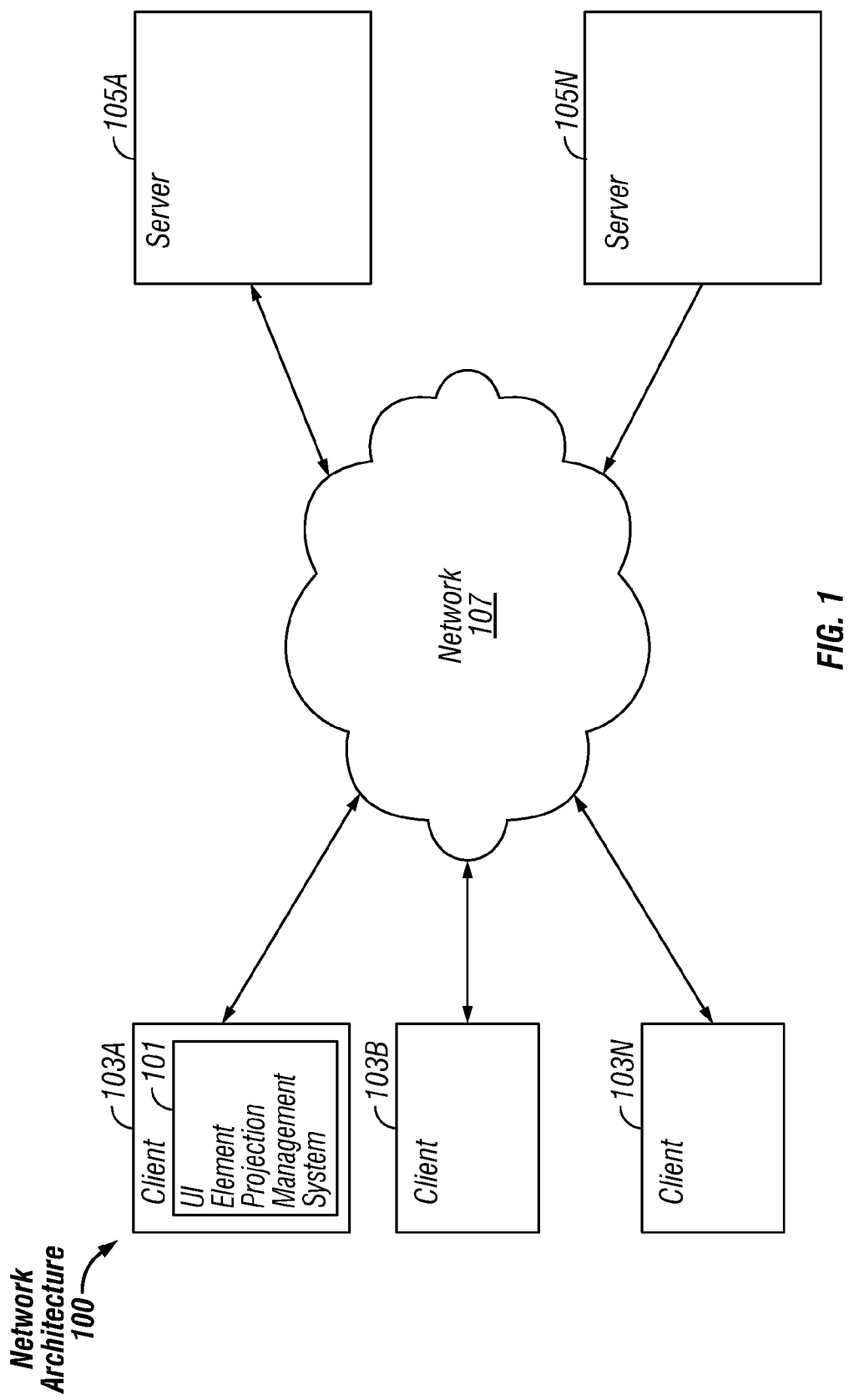
FIG. 1 is a block diagram of an exemplary network architecture in which a user interface element projection management system can be implemented, according to some embodiments.

FIG. 1 is a block diagram illustrating an exemplary network architecture 100 in which a user interface element projection management system 101 can be implemented. The illustrated network architecture 100 comprises multiple clients 103A, 103B and 103N, as well as multiple servers 105A and 105N. In FIG. 1, the user interface element projection management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
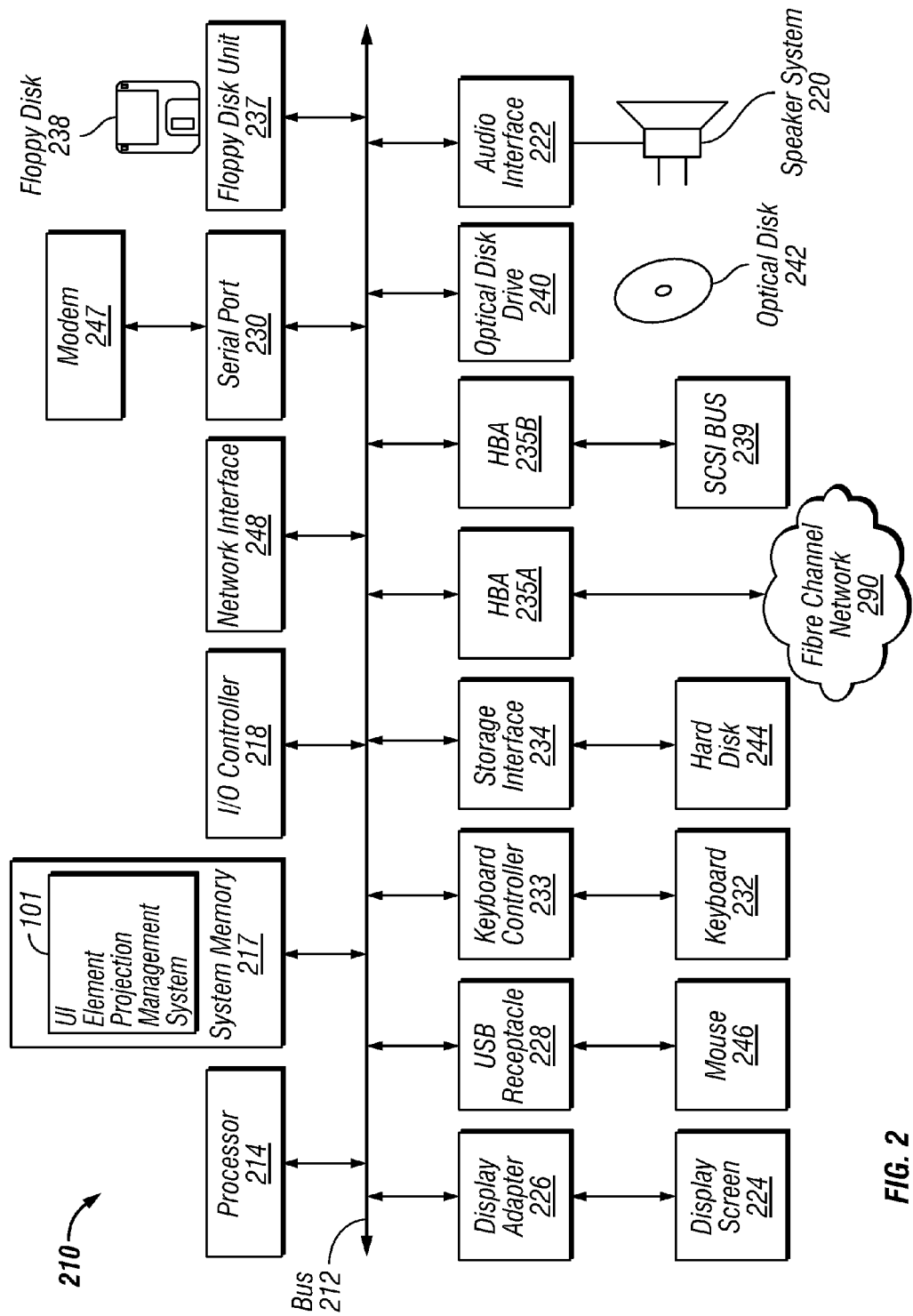
FIG. 2 is a block diagram of a computer system suitable for implementing a user interface element projection management system, according to some embodiments.

FIG. 2 is a block diagram of a computer system 210 suitable for implementing a user interface element projection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the user interface element projection management system 101 is illustrated as residing in system memory 217. The workings of the user interface element projection management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
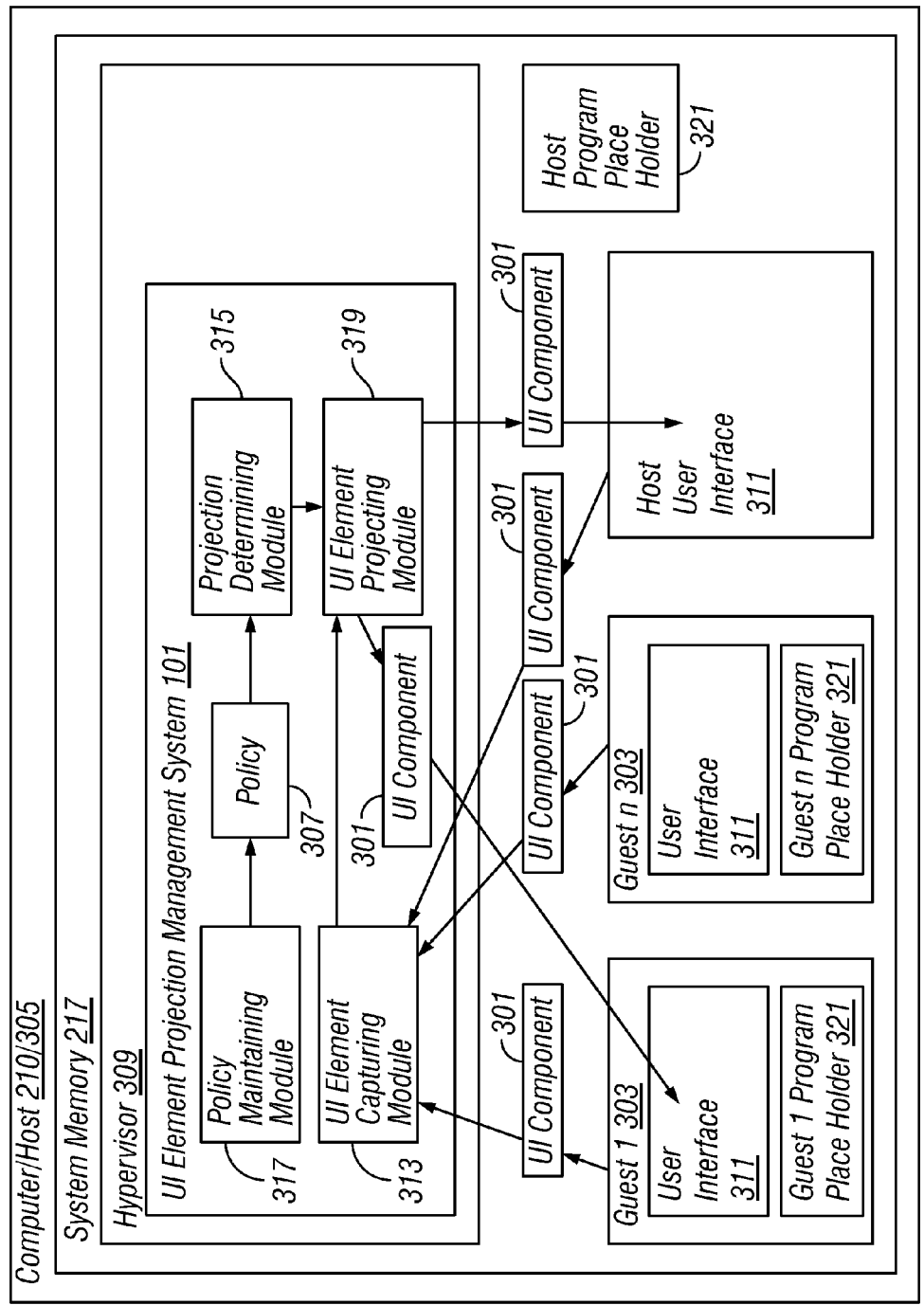
FIG. 3 is a block diagram of the operation of a user interface element projection management system, according to some embodiments.

FIG. 3 illustrates the operation of a user interface element projection management system 101 residing in the system memory 217 of a computer 210, according to some embodiments. As described above, the functionalities of the user interface element projection management system 101 can reside on a client 103, a server 105, or be distributed between multiple computer systems 210, including within a cloud-based computing environment in which the functionality of the user interface element projection management system 101 is provided as a service over a network 107. It is to be understood that although the user interface element projection management system 101 is illustrated in FIG. 3 as a single entity, the illustrated user interface element projection management system 101 represents a collection of functionalities, which can be instantiated as a single or multiple modules as desired (an instantiation of specific, multiple modules of the user interface element projection management system 101 is illustrated in FIG. 3). It is to be understood that the modules of the user interface element projection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the user interface element projection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the user interface element projection management system 101 allows selective, policy 307 driven projection of user interface elements 301 originating from the operating system environment of the host 305 or of any guest 303 into the current, active user interface context of another guest 303 or of the host 305. As explained in more detail below, user interface elements 301 can be projected from their originating operating system environment into another display context according to a configurable policy 307. The policy 307 can specify which user interface elements 301 are to be projected from which operating system environments to which other operating system environments under what circumstances. The policy 307 can specify rules governing user interface element 301 projection (and suppression) at a source, context, content and/or destination level. User interface elements 301 can be projected from the host 305 to a guest 303, from one guest 303 to another and/or from a guest 303 to the host 305, according to the policy 307.

As illustrated in FIG. 3, in some embodiments the user interface element projection management system 101 runs at a hypervisor 309 level. As illustrated, multiple guests 303 (virtual machines) and a hypervisor 309 run in the computer memory 217 of a host 305, which can be in the form of a physical computer 210, for example of the type illustrated in FIG. 2. In FIG. 3, only two guests 303 are shown for illustrative purposes, but in practice many more can be deployed. The user interface 311 of the host 305 is illustrated as residing in its system memory 217. Each guest also has a user interface 311. It any given time, the host 305 or one of the guests 303 may be running in full screen mode, in which case the user is immersively interacting with the respective user interface 311 (i.e., the user interface 311 of the host 305 or guest 303 running in full screen mode). In that case, without the use of the user interface element projection management system 101, the user would be unable to see user interface elements 301 originating from other sources (e.g., from the host 305 or another guest 303 where the user is running a specific guest 303 in full screen mode).

A user interface element capturing module 313 of the user interface element projection management system 101 can capture user interface elements 301 generated by the various user interface contexts (i.e., that of the host 305 and of the various guests 303). Thus, when a user is interacting with the user interface 311 of a specific guest 303 or the host 305, the user interface element capturing module 313 captures user interface elements 301 generated by the user interfaces 311 of the operating system environments with which the user is not directly interacting (i.e., the host 305 and the other guests 303 when the user is interacting with a guest 303, or the guests 303 when the user is interacting with the host 305). As used herein, the term "user interface element" 301 means anything to be output to the user through the user interface 311 (e.g., a window, menu, alert, text box, error message, string, sound, etc.) The user interface element capturing module 313 is able to capture user interface elements 301 generated by the host 305 or any guest 303 because it is running at a hypervisor level 309.

When the user interface element capturing module 313 captures a user interface element 301, a projection determining module 315 of the user interface element projection management system 101 determines whether to project the captured user interface element 301 into the user interface 311 of the operating system environment with which the user is currently directly interacting. To make this determination, the projection determining module 315 reads the policy 307, which specifies what types of user interface elements 301 are to be projected from which sources into which destinations under which conditions. The projection determining module 315 determines whether to suppress the specific captured user interface element 301 or project it into the currently active user interface 311 with which the user is interacting, based on the policy 307.

Concerning the policy 307, a policy maintaining module 317 of the user interface element projection management system 101 maintains the policy 307. In some embodiments, a default policy 307 is provided with the user interface element projection management system 101. In some embodiments, the policy can be edited or configured by a system administrator, IT professional, user and/or other individuals. In some embodiments, default policy 307 updates can be distributed, e.g., over the Internet from a server 105 (not illustrated).

The policy 307 can specify projection directives at any desired level of granularity. The policy 307 can define unidirectional and or bidirectional user interface element 301 projection paths between the host 305 and specific guests 303 and between multiple ones of the specific guests 303. In other words, user interface elements 301 can be projected and/or suppressed according to origin and/or destination as desired. In addition to or instead of defining specific guests 303 of origin and/or destination, the policy can also specify arbitrary guest names with wildcards (e.g., "Dev-*").

The policy 307 can also specify conditions under which user interface elements 301 are to be projected and/or suppressed. For example, the policy can specify to filter user interface elements 301 to project by application of origin, by folder from which application is running, or according to arbitrary name and/or path of the application (e.g., "*:\*\Microsoft Office\*.exe"). In addition to application of origin, the policy can specify to project user interface elements (e.g., alerts) originating from the operating system, and/or from a particular subsystem thereof such as the file system.

Additionally, the policy 307 can specify to project or suppress user interface elements 301 according to attributes and/or content of the user interface elements 301 themselves. Examples of this include window title, window type (e.g., ok/cancel dialog box), window string contents (e.g., string contains text "CRITICAL" or "Warning"), window graphical content (e.g., specific icons or icon IDs, such as known icons indicating criticality of warning).

It is to be understood that the above examples are illustrative only, and in various embodiments the policy 307 can specify various other factors according to which to determine whether to project or suppress specific user interface elements 301 according to origin, destination, context, circumstances, element content or other attributes and/or combinations of these factors.

Returning to the discussion of the processing of captured user interface elements 301, in some instances the projection determining module 315 determines to project a specific captured user interface element 301 based on the policy 307. In this case, a user interface element projecting module 319 of the user interface element projection management system 101 projects the specific captured user interface element 301 into the user interface 311 of the operating system environment with which the user is currently interacting, such that the projected user interface element 301 is output to the user. For example, if the user is currently interacting with a specific guest 303 in full screen mode, conventionally the user would not see user interface elements 301 generated by the host 305 or other guests 303. However, suppose the host 305 generates a specific alert which the projection determining module 315 determines to project into the user interface 311 of the active guest 303 based on the policy 307. In this case, the user interface element projecting module 319 projects the captured user interface element 301 (the host generated alert) into the active foreground of the user interface 311 of guest 303 which the user is operating in full screen mode, such that the user is made aware of the alert. The user interface element projection module 319 is able to project captured user interface elements 301 generated by any guest 303 into the user interface 311 of the host 305 or any other guest 303 because it is running at a hypervisor level 309. As explained below, the user interface element projection module 319 is also able to project captured user interface elements 301 generated by the host 305 into the user interface 311 of any guest 303.

In one embodiment, the projection of user interface elements 301 is implemented via program place holders 321 running on the host 305 and each guest 303. When projecting captured user interface components 301, the place holder 321 on the source component can communicate with the place holder 321 on the target component. In the example of projecting user interface elements 301 captured on a guest 303 (source) into the user interface 311 on the host 305 (target), the display pixels of the captured user interface component(s) 301 on the guest 303 are captured and transmitted by the guest's place holder 321 to the host's place holder 321, so that the user interface 311 of the host 305 can mimic the appearance of the user interface 311 of the guest 303. The user's input (e.g., mouse and keyboard activities) on the host 305 in response to the display of the projected user interface component(s) 301 is captured by the host's place holder 321 and transmitted thereby back to the guest's place holder 321, which replays that user input activity on the guest 303. This same process works for projection between multiple guests 303. For projection from the host 305 into a guest 303, the above-described process is reversed (host's place holder 321 monitors and transmits display pixels of captured user interface elements 301 to the guest's place holder 321, which displays them, monitors resulting user input, and transmits the resulting user input back to the host 305). It is to be understood that in some embodiments, the place holders 321 communicate with one another via the hypervisor 309, but in other embodiments place holder 321 to place holder communicate is done in other ways, for example via conventional TCP/IP sockets. It is to be understood that as used herein the term "program place holder" 321 simply means a process having the above-described functionality.

A walk through of several specific use cases should be helpful to understand the types of scenarios that the user interface element projection management system 101 enables. As a first example, suppose a user is interacting with a specific guest 303 in a full screen context in order to develop software, and the operating system of the host 305 is about to hibernate due to lack of battery power. The host 305 operating system generates a corresponding alert (a user interface element 301), warning the user that the operating system is about to enter hibernation mode, and that the user should save all work and close any active programs. However, because the user is immersed in a guest 303 operating system environment in full screen mode, conventionally the user would not see the alert, and potentially lose valuable work in progress and encounter other difficulties when the host's operating system hibernates while the user is actively working. However, where the policy 307 specifies that alerts of this type from the host 305 are to be projected into the specific guest 303, the user interface element projection module 319 projects the alert into the guest's user interface 311, which is operating in a full screen context, such that the user sees it. The user can then save all open work and close open programs in response to the alert, thereby allowing for a smooth shutdown.

Another example of a scenario is enabling the user to receive alerts in the event that any environment (host 305 or guest 303) is running critically low on a key resource, such as memory or disk space, regardless of which user interface 311 context is currently active. By specifying in the policy 307 that alerts from any operating system indicating that a key resource is running critically low are to be projected into any destination, the user can always be assured of receiving such alerts and being able to address the resource shortage in a timely manner, even where the user is immersed in the user interface 311 of another operating system. Yet another useful scenario involves responding to requests for input during long processes such as Windows updates, even where the user is in an operating system context other than the one running the long process. For example, suppose the user starts a Windows update in one guest 303, but wants to work in another guest 303 while the update is running. It is desirable that long procedures such as updating Windows keep moving towards completion. However, during the process of downloading and installing Windows updates, certain dialog boxes pop up and require user input to continue after the process has been started (e.g., click here to proceed to the next step). Conventionally, a user who has started an update in one user interface context and subsequently switched to a different context (e.g., from one guest 303 to another) would not see these dialog boxes, which are generated by the operating system of the first guest 303, until switching back into the original user interface 311 context. In the meantime, the process would wait for the requested user input, or even potentially timeout. However, with the user interface element projection management system 101, the user can configure the policy 307 to specify that such dialog boxes are to be projected between contexts (e.g., between any two operating system contexts, or between specific contexts as desired). In that case, the user interface element projection module 319 projects the dialog boxes from the first guest 303 into the active user interface 311, and the user is able to keep the update moving forward while working in the second guest 303.

It is to be understood that is typically desirable not to distract the user by projecting unwanted user interface elements 301 from other contexts into the active user interface 311. For this reason, in one embodiment the projection determining module 315 determines to suppress (i.e., not to project) captured user interface elements 301 between contexts unless the policy 307 indicates to project a captured element 301 under a current set of circumstances. In one embodiment, the policy specifically indicates to suppress projecting some user interface elements 301 from some sources to some destinations under some conditions. Where the projection determining module 315 determines to suppress a captured user interface element 301 based on the policy 307, the user interface element projection module 319 does not project that element 301 into the active user interface 311. Although the active user interface 311 is often described herein as being full screen mode, other possibilities also exist. For example, the active user interface context could be a Unity/Coherence type context in which multiple user interface 311 contexts are combined.

The user interface element projection management system 101 as described above enables the projection of user interface elements 301 from the host 305 operating system into the virtual environment of a guest 303, as well as between guests 303 and/or from guests 303 into the host 305. As described above, the user interface element 301 projection is done according to a configurable policy 307 that specifies from which sources to project which user interface elements 301 or element 301 types into which destinations, and under what conditions and/or contexts such projections are to be triggered and/or suppressed. The user interface element projection management system 101 allows all application sets to be run as virtual appliances, with the user experiencing a single, seamless user interface canvas. As the mediator of seamless, policy based user interface element 301 projection, the user interface element projection management system 101 forms the foundation for realizing this vision.

Figure 4:
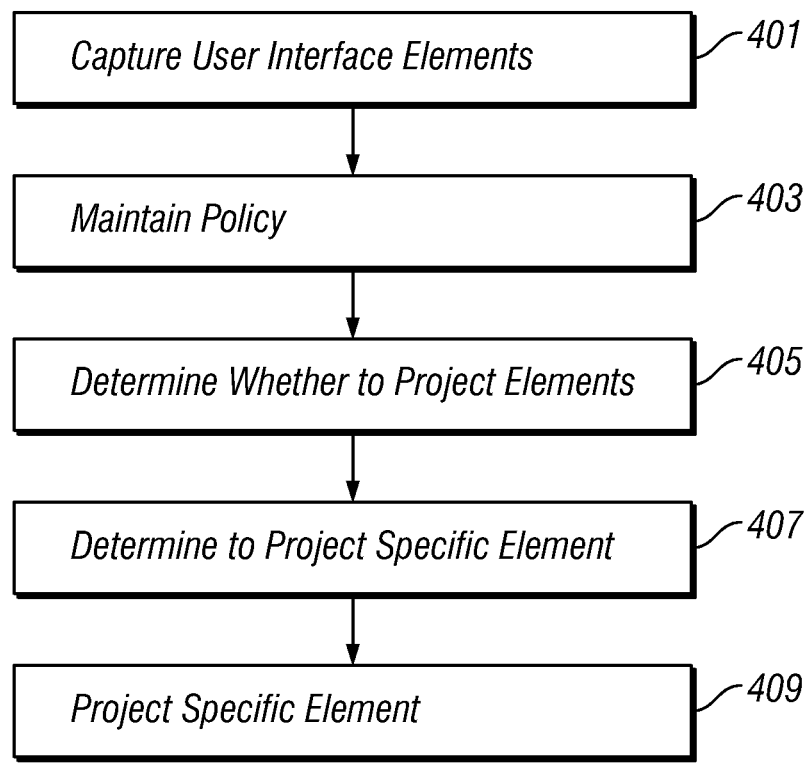
FIG. 4 is a flowchart of the operation of a user interface element projection management system, according to some embodiments.

FIG. 4 illustrates steps of the operation of the user interface element projection management system 101 (FIG. 1), according to some embodiments. The user interface element capturing module 313 (FIG. 3) captures 401 user interface elements 301 (FIG. 3) generated by various user interfaces 311 (FIG. 3), such as those of the host 305 (FIG. 3) and of the various guests 303 (FIG. 3). The policy maintaining module 317 (FIG. 3) maintains 403 a policy 307 (FIG. 3) indicating user elements 301 (FIG. 3) to be projected between sources and destinations under different conditions. The projection determining module 315 (FIG. 3) determines 405 whether to project captured user interface elements 301 (FIG. 3) into the user interface 311 (FIG. 3) of the operating system environment with which the user is currently directly interacting, based on the policy 307 (FIG. 3). The projection determining module 315 (FIG. 3) determines 407, based on the policy 307 (FIG. 3), at least one specific captured user interface element 311 (FIG. 3) originating from a first user interface 311 (FIG. 3) context to project into the user interface 311 (FIG. 3) of the operating system environment with which the user is currently interacting. Responsive to the determination, the user interface element projecting module 319 (FIG. 3) projects 409 the captured user interface element 301 (FIG. 3) originating from the first user interface 311 (FIG. 3) context into a second user interface context, thereby presenting the projected user interface element 301 (FIG. 3) to the user.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling selective projection of user interface elements between and among a host and a plurality of guests, based on a policy, the method comprising the steps of:

capturing, by a computer user interface elements generated by at least some guests of the plurality;

determining, by the computer, whether to project captured user interface elements into a user interface of an operating system environment on a virtual machine with which a user is currently interacting, based on a policy indicating user elements to be projected between sources and destinations under conditions;

determining, by the computer, to project, based on the policy, at least one specific captured user interface element originating from a first user interface context into the user interface of the operating system environment on a virtual machine with which the user is currently interacting, said user interface of the operating system environment on the virtual machine with which the user is currently interacting being a second user interface context;

responsive to determining to project the at least one specific captured user interface element into the user interface of the operating system environment on the virtual machine with which the user is currently interacting, projecting, by the computer the at least one specific captured user interface element originating from the first user interface context into the second user interface context, thereby presenting the projected specific captured user interface element to the user of the virtual machine; and simultaneously presenting at least one projected specific user interface element captured from each of a plurality of sources to the user of the virtual machine to appear as if presented on a single, seamless user interface canvas.

2. The method of claim 1 wherein capturing, by the computer user interface elements generated by at least some guests of the plurality further comprises:

when the user is directly interacting with a user interface of a specific operating system environment, capturing user interface elements generated by operating system environments with which the user is not directly interacting.

3. The method of claim 1 wherein capturing, by the computer user interface elements generated by at least some guests of the plurality further comprises:
  capturing user interface elements generated by the host and at least some guests of the plurality.

4. The method of claim 1 wherein capturing, by the computer user interface elements generated by at least some guests of the plurality further comprises:
  capturing user interface elements generated by all of the guests of the plurality.

5. The method of claim 1 wherein determining, by the computer, whether to project captured user interface elements into the user interface of the operating system environment on the virtual machine with which the user is currently interacting, based on the policy indicating user elements to be projected between sources and destinations under conditions further comprises:
  determining whether to project a specific captured user interface element into the user interface of the operating system environment on the virtual machine with which the user is currently interacting, responsive to at least a source of the specific captured user interface element.

6. The method of claim 1 wherein determining, by the computer, whether to project captured user interface elements into the user interface of the operating system environment on the virtual machine with which the user is currently interacting, based on the policy indicating user elements to be projected between sources and destinations under conditions further comprises:
  determining whether to project a specific captured user interface element into the user interface of the operating system environment on the virtual machine with which the user is currently interacting, responsive to at least an identity of the operating system environment with which the user is currently interacting.

7. The method of claim 1 wherein determining, by the computer, whether to project captured user interface elements into the user interface of the operating system environment on the virtual machine with which the user is currently interacting, based on the policy indicating user elements to be projected between sources and destinations under conditions further comprises:
  determining whether to project a specific captured user interface element into the user interface of the operating system environment on the virtual machine with which the user is currently interacting, responsive to at least one attribute of the specific captured user interface element.

8. The method of claim 1 wherein determining, by the computer, whether to project captured user interface elements into the user interface of the operating system environment on the virtual machine with which the user is currently interacting, based on the policy indicating user elements to be projected between sources and destinations under conditions further comprises:
  determining whether to project a specific captured user interface element into the user interface of the operating system environment on the client with which the user is currently interacting, responsive to at least contents of the specific captured user interface element.

9. The method of claim 1 wherein determining, by the computer, whether to project captured user interface elements into the user interface of the operating system environment on the virtual machine with which the user is currently interacting, based on the policy indicating user elements to be projected between sources and destinations under conditions further comprises:
  determining whether to project a specific captured user interface element into the user interface of the operating system environment on the virtual machine with which the user is currently interacting, responsive to at least a type of the specific captured user interface element.

10. The method of claim 1 further comprising:
  maintaining, by the computer, the policy indicating user elements to be projected between sources and destinations under conditions.

11. The method of claim 10 further comprising:
  receiving, by the computer, at least one configuration to the policy; and
  updating the policy, by the computer, responsive to the at least received configuration.

12. The method of claim 1 further comprising:
  determining, by the computer, based on the policy, to suppress projecting at least one specific captured user interface element into the user interface of the operating system environment on a virtual machine with which the user is currently interacting.

13. The method of claim 1 wherein projecting, by the computer the at least one specific captured user interface element originating from the first user interface context into the second user interface context further comprises:
  projecting, by the computer, the at least one specific captured user interface element originating from the host into a user interface context of a specific guest.

14. The method of claim 1 wherein projecting, by the computer the at least one specific captured user interface element originating from the first user interface context into the second user interface context further comprises:
  projecting, by the computer, the at least one specific captured user interface element originating from a specific guest into a user interface context of the host.

15. The method of claim 1 wherein projecting, by the computer the at least one specific captured user interface element originating from the first user interface context into the second user interface context further comprises:
  projecting, by the computer, the at least one specific captured user interface element originating from a first specific guest into a user interface context of a second specific guest.

16. At least one non-transitory computer readable storage medium storing a computer program product for enabling selective projection of user interface elements between and among a host and a plurality of guests, based on a policy, the computer program product comprising:
  program code for capturing user interface elements generated by at least some guests of the plurality;
  program code for determining whether to project captured user interface elements into a user interface of an operating system environment on a virtual machine with which a user is currently interacting, based on a policy indicating user elements to be projected between sources and destinations under conditions;
  program code for determining to project, based on the policy, at least one specific captured user interface element originating from a first user interface context into the user interface of the operating system environment on a virtual machine with which the user is currently interacting, said user interface of the operating system environment on the virtual machine with which the user is currently interacting being a second user interface context;
  program code for, responsive to determining to project the at least one specific captured user interface element into the user interface of the operating system environment on the virtual machine with which the user is currently interacting, projecting the at least one specific captured user interface element originating from the first user interface context into the second user interface context, thereby presenting the projected specific captured user interface element to the user of the virtual machine; and program code for simultaneously presenting at least one projected specific user interface element captured from each of a plurality of sources to the user of the virtual machine to appear as if presented on a single, seamless user interface canvas.

17. The computer program product of claim 16 wherein the program code for capturing user interface elements generated by at least some guests of the plurality further comprises:

program code for, when the user is directly interacting with a user interface of a specific operating system environment, capturing user interface elements generated by operating system environments with which the user is not directly interacting.

18. The computer program product of claim 16 wherein the program code for determining whether to project captured user interface elements into the user interface of the operating system environment on the virtual machine with which the user is currently interacting, based on the policy indicating user elements to be projected between sources and destinations under conditions further comprises:

program code for determining whether to project a specific captured user interface element into the user interface of the operating system environment on the virtual machine with which the user is currently interacting, responsive to at least one factor from a group of factors consisting of: a source of the specific captured user interface element; an identity of the operating system environment with which the user is currently interacting; at least one attribute of the specific captured user interface element; contents of the specific captured user interface element; and a type of the specific captured user interface element.

19. The computer program product of claim 16 wherein the program code for projecting the at least one specific captured user interface element originating from the first user interface context into the second user interface context further comprises program code for performing at least one step for a group of steps consisting of:

projecting the at least one specific captured user interface element originating from the host into a user interface context of a specific guest;

projecting the at least one specific captured user interface element originating from a specific guest into a user interface context of the host; and projecting the at least one specific captured user interface element originating from a first specific guest into a user interface context of a second specific guest.

20. A computer system for enabling selective projection of user interface elements between and among a host and a plurality of guests, based on a policy, the computer system comprising:

a processor;

system memory;

a policy maintaining module residing in the system memory, the policy maintaining module being configured for maintaining a policy indicating user elements to be projected between sources and destinations under conditions;

a user interface element capturing module residing in the system memory, the user interface element capturing module being configured for capturing user interface elements generated by at least some guests of the plurality;

a projection determining module residing in the system memory, the projection determining module being configured for determining whether to project captured user interface elements into a user interface of an operating system environment on a virtual machine with which a user is currently interacting, based on a policy indicating user elements to be projected between sources and destinations under conditions;

wherein the projection determining module is further configured for determining to project, based on the policy, at least one specific captured user interface element originating from a first user interface context into the user interface of the operating system environment on a virtual machine with which the user is currently interacting, said user interface of the operating system environment on the virtual machine with which the user is currently interacting being a second user interface context;

a user interface element projecting module residing in the system memory, the user interface element projecting module being configured for, responsive to determining to project the at least one specific captured user interface element into the user interface of the operating system environment on the virtual machine with which the user is currently interacting, projecting the at least one specific captured user interface element originating from the first user interface context into the second user interface context, thereby presenting the projected specific captured user interface element to the user of the virtual machine; and said user interface projecting module being further configured for simultaneously presenting at least one projected specific user interface element captured from each of a plurality of sources to the user of the virtual machine to appear as if presented on a single, seamless user interface canvas.

\* \* \* \* \*